United States Patent [19]

Une

[11] Patent Number: 4,457,557

[45] Date of Patent: Jul. 3, 1984

[54] RECLINING DEVICE FOR USE IN A VEHICLE

[76] Inventor: Toshiaki Une, 25-7, 6-chome Unuma Yamazaki-cho, Kagamigahara-shi, Gifu, Japan

[21] Appl. No.: 335,675

[22] Filed: Dec. 30, 1981

[51] Int. Cl.³ ............................................. B60N 1/02
[52] U.S. Cl. .................................. 297/362; 297/367; 297/379
[58] Field of Search ............... 297/362, 366, 367, 368, 297/369, 292, 379, 300; 16/304, 354, 341

[56] References Cited

U.S. PATENT DOCUMENTS

| | | | |
|---|---|---|---|
| 3,216,766 | 11/1965 | Tabor | 297/379 |
| 3,973,288 | 8/1976 | Pickles | 297/367 |
| 4,113,308 | 9/1978 | Werner et al. | 297/362 |
| 4,314,729 | 2/1982 | Klueting | 297/366 |
| 4,382,630 | 5/1983 | Weston | 297/362 |

FOREIGN PATENT DOCUMENTS 2459070  6/1975  Fed. Rep. of Germany ...... 297/366

Primary Examiner—William E. Lyddane
Assistant Examiner—Mark W. Binder
Attorney, Agent, or Firm—Holman & Stern

[57] ABSTRACT

A reclining device for use on a vehicle seat in which an intermediate bracket is rotatably supported on an eccentric shaft between a stationary bracket secured to a vehicle seat cushion and a movable bracket secured to a seat back, said stationary bracket and intermediate bracket are operatively connected together by a stepwisely adjustable engaging mechanism operable by an operation lever, a differential reduction gearing mechanism including internal and external gears having the same pitch and differing in tooth number is interposed between said intermediate bracket and said movable bracket and a spiral spring acts between said stationary bracket and said intermediate bracket to urge said movable bracket so that the seat back is urged upwardly forwardly.

3 Claims, 5 Drawing Figures

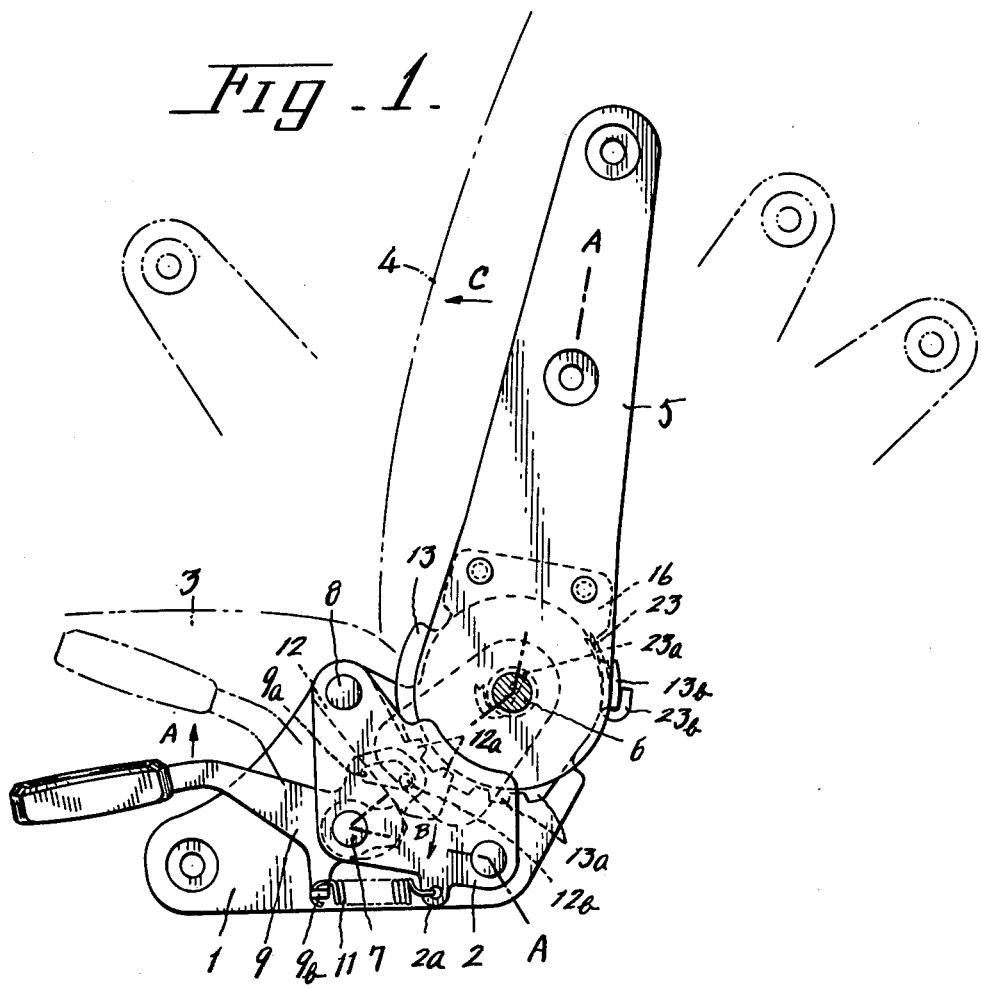

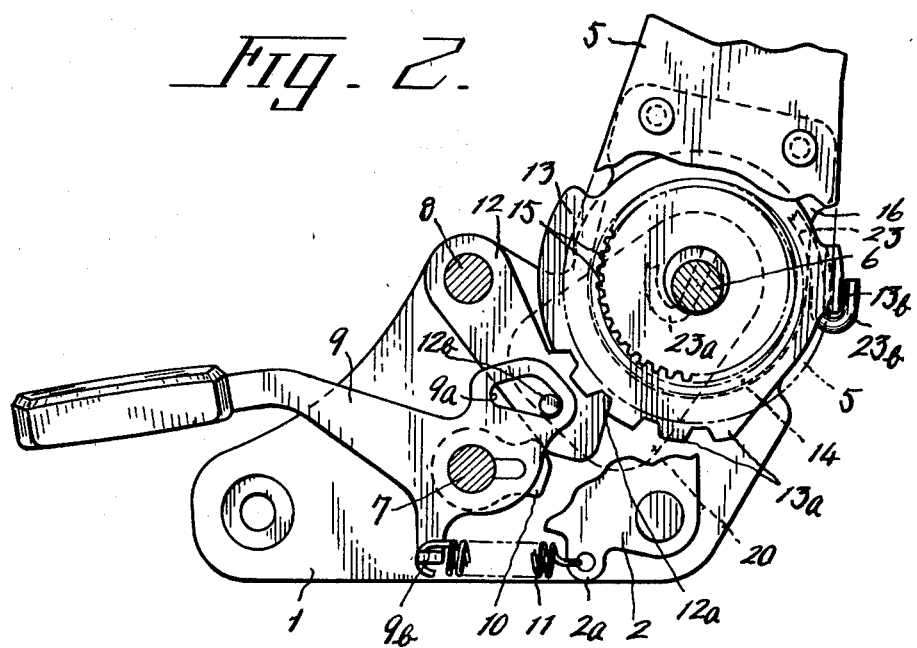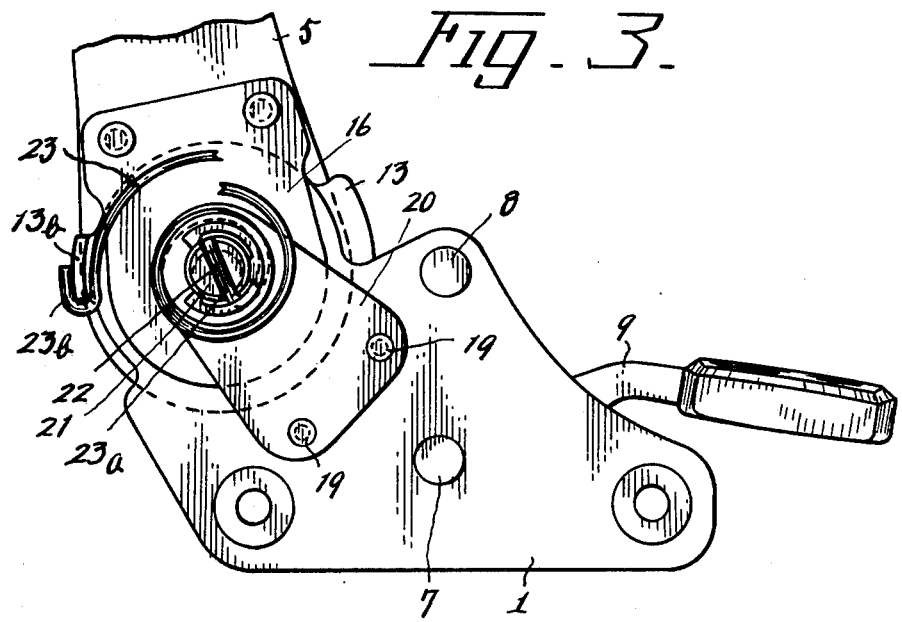

RECLINING DEVICE FOR USE IN A VEHICLE

BACKGROUND OF THE INVENTION

1. Field of the Invention

This invention relates to a reclining device adapted to be attached to a vehicle seat for adjustably controlling the position of the seat back and more particularly, to a novel and improved reclining device which incorporates a differential reduction gearing mechanism having internal and external gears which have the same pitch but differ in the number of teeth and which are adapted to engage and disengage from each other as an eccentric shaft rotates.

2. Description of the Prior Art

There have been proposed and practically employed a variety of reclining devices for attachment to vehicle seats and one typical prior art reclining device of this type comprises a differential reduction gearing mechanism interposed between a bracket associated with a vehicle seat cushion and a bracket associated with a vehicle seat back and incorporating internal and external gears which have the same pitch but differ in the number of teeth and which are adapted to engage each other through an eccentric shaft so that the inclination position of the seat back can be adjusted steplessly.

However, such a prior art reclining devices have been proved inconvenient by the fact the when that inclination position of the seat back is substantially adjusted or the seat back is inclined forwardly, the eccentric shaft has to be rotated many times. The inconvenience of the prior art reclining devices is especially conspicuous when the reclining devices are employed in connection with a two-door type vehicle where an occupant has access to the rear seat only while the front seat is inclined forwardly.

SUMMARY OF THE INVENTION

The present invention eliminates the inconvenience inherent in the above-mentioned prior art reclining device for vehicle seats. For this purpose, according to the present invention, there has been provided a reclining device for vehicle seats which is characterized by the fact that an intermediate bracket is interposed between a bracket associated with a vehicle seat cushion and a bracket associated with a vehicle seat back, the bracket associated with the seat cushion and the intermediate bracket are operatively connected together by means of a safe and positive stepwisely adjustable engaging mechanism, a differential reduction gear mechanism is interposed between the intermediate bracket and the bracket associated with the seat back and a spiral spring acts between the bracket associated with the seat cushion and the intermediate bracket. Furthermore, a reinforcement plate is attached to the bracket associated with the seat cushion so as to embrace the stepwise adjustable engaging mechanism in cooperation with the bracket associated with the seat cushion so that any impact applied to the engaging teeth directly acts on the seat cushion frame.

One purpose of the present invention is to make the inclination angle of the vehicle seat back adjustable steplessly. Another object of the present invention is to make it possible to adjust the forward inclination of the seat back in a simple and coarse stepwise operation. A further object of the present invention is to provide a spiral spring which enables adjusting the inclination angle of the seat back easily and steplessly with a constant operation force independently of differential gears associated with the seat back. A still further object of the present invention is to provide excellent properties with respect to strength and safety by causing any impact applied to the intermeshing teeth of a stepwise adjusting mechanism to act directly on the frame associated with the seat cushion.

According to the present invention, there has been provided a reclining device for use in a vehicle comprising a stationary bracket secured to a vehicle cushion, a movable bracket secured to a vehicle seat back and connected to said stationary bracket, a reinforcement plate connected to said stationary bracket, an operation lever interposed rotatably between said stationary bracket and said reinforcement plate and extending outwardly from the stationary bracket and plate, a pressure plate interposed rotatably between said stationary bracket and said reinforcement plate interlocking with said operation lever, a coiled spring extending between and secured to said reinforcement plate and said operation lever, an engaging member interposed rotatably between said stationary bracket and said reinforcement plate interlocking with said operation lever and having teeth at one end, an intermedaite bracket interposed rotatably between said stationary bracket and said movable bracket and having teeth about said intermediate bracket for engaging and disengaging said teeth on the engaging member, a rotary eccentric shaft extending through said stationary bracket, said reinforcement plate and said movable bracket for supporting the stationary and movable brackets and reinforcement plate for rotation in unison with the eccentric shaft, a support plate secured to said movable bracket for rotatably supporting one end of said eccentric shaft, a handle secured to the other end of said eccentric shaft, a second support plate secured to said stationary bracket, an engaging stub shaft secured at one end to said second support plate, and a spiral spring extending between and anchored to said intermediate bracket and said engaging stub shaft for urging said seat back forwardly.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

BRIEF DESCRIPTION OF THE DRAWINGS

The accompanying drawings show preferred embodiments of the reclining device for vehicular seats constructed in accordance with the present invention wherein:

FIG. 1 is a side elevational view of a first embodiment of the reclining device constructed in accordance with the present invention;

FIG. 2 is a fragmentary side elevational view on an enlarged scale of said reclining device as shown in FIG. 1 with portions of the reinforcement plate and of the movable bracket associated with a vehicle seat back cut away;

FIG. 3 is a view similar to FIG. 2, but shows the reclining device as seen from the opposite side of FIG. 2;

Figure 4:
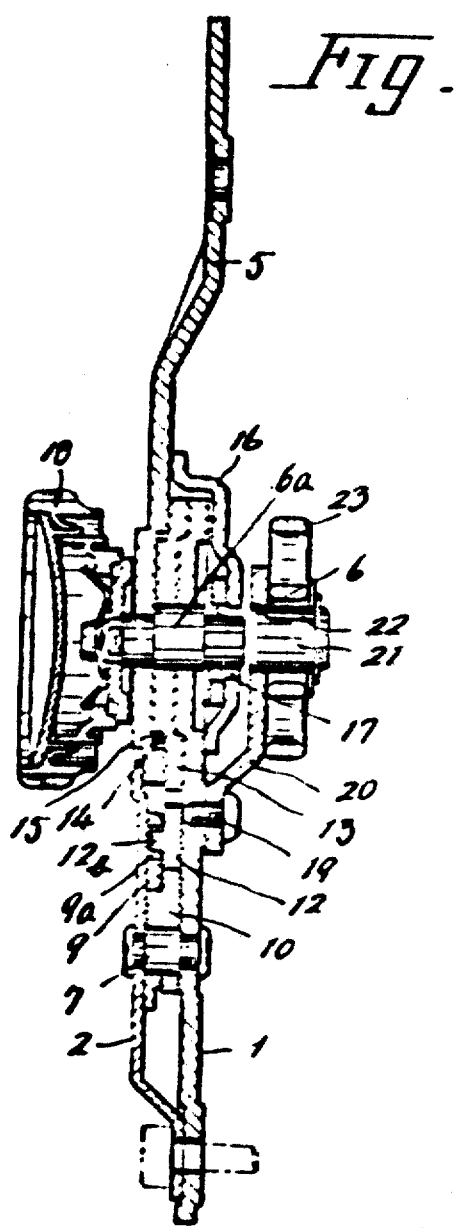
FIG. 4 is a vertical cross sectional view taken substantially along the line A—A of FIG. 1; and differential reduction gearing mechanism. In short, when the operation lever 9 is operated to disengage the engaging mechanism, the spiral spring 23 causes both the intermediate bracket 13 and movable bracket 5 to rotate in the direction of the arrow C together with the eccentric stub shaft 6 as shown in FIG. 1 to thereby incline the seat back 4 forwardly.

When the seat back 4 is desired to be returned to its initial or normal substantially upright position, the seat back 4 is rotated backwardly against the force of the spiral spring 23 until the engaging teeth 12a on the engaging member 12 engage the mating engaging teeth 13a on the intermediate bracket 13 again whereupon the seat back 4 is held in its initial or substantially upright position.

It is also envisaged that the meshing or engaging relationship between the engaging teeth 12a and 13a on the engaging member 12 and intermediate bracket 13 can be selectively varied by selectively operating the operation lever 9 whereby the inclination angle of the seat back 4 can be coarsely adjusted within the scope of the present invention.

As clear from the foregoing description on the preferred embodiments of the present invention, according to the present invention, the intermediate bracket 13 is interposed between the stationary bracket 1 associated with the seat cushion 3 and the movable bracket 5 associated with the seat back 4, the stationary bracket 1 associated with the seat cushion 3 and the intermediate bracket 13 are connected together through the stepwisely adjustable engaging mechanism, the differential reduction gearing mechanism is interposed between the intermediate bracket 13 and movable bracket 5, the spiral spring 23 extends between and is anchored to the stationary bracket 1 associated with the seat cushion 3 and the intermediate bracket 13 is interposed between the stationary bracket 1 and the reinforcement plate 2 secured at one end to the seat cushion 3 and at the other end to the reinforcement plate 2 by means of the stepped stub shafts 7, 8. The above-mentioned arrangement of the components of the reclining device according to the present invention provides the following advantages:

(1) The inclination angle of the seat back can be adjusted steplessly by the differential reduction gearing mechanism and the forward inclination and coarsely angular position adjustment of the seat back can be also made possible by simple operating of the operation lever.

(2) The spiral spring acts only between the stationary bracket associated with the seat cushion and the intermediate bracket independently of the operation of the differential reduction gearing mechanism interposed between the intermediate bracket and the seat back whereby the inclination angle of the seat back can be easily and steplessly adjusted with a constant operation force.

(3) The stepwisely adjustable engaging mechanism interposed between the stationary bracket and reinforcement plate provides excellent properties with respect to strength and safety because any impact applied to the intermeshing teeth directly acts on the seat cushion frame through the reinforcement plate and stationary bracket associated with the seat cushion and the bolts.

Although the foregoing description illustrates the preferred embodiments of the invention, variations are possible. All such variations as would be obvious to one skilled in the art are intended to be included within the scope of the invention as defined by the appended claims.

What is claimed is:

1. A hinge fitting for adjustably positioning the seat back of a vehicle seat comprising, a stationary bracket adapted to be mounted on the lower seat element of a vehicle seat, a movable bracket adapted to be mounted on the seat back, an eccentric shaft having an eccentric portion disposed between two coaxial end portions, one end of said shaft being rotatably mounted in said movable bracket, a shaft supporting bracket mounted on said movable bracket and rotatably supporting the other end of said shaft, a hole in said stationary bracket rotatably receiving said eccentric portion of said shaft, an intermediate bracket rotatably mounted on said eccentric portion of said shaft between said stationary bracket, and said movable bracket, a differential reduction gearing mechanism operably engaging said intermediate bracket with said movable bracket comprising external gear teeth on said intermediate bracket and internal gear teeth on said movable bracket meshing with said external gear teeth and having the same pitch but a larger diameter and slightly greater number of teeth, handle means connected to said eccentric shaft at said one end thereof to rotate said shaft and eccentric portion to thereby operate said gear mechanism to adjust the inclination of said seat back, a support plate mounted on said stationary bracket and extending over said other end of said eccentric shaft, a stub shaft fixedly mounted in said support plate substantially coaxially and colinearly with respect to said eccentric shaft, a spiral spring mounted on and operatively connected at one end to said stub shaft and at the other end to said intermediate bracket for resiliently urging said movable bracket through said gearing mechanism toward the upright forward position of said seat back, a hand operating lever pivotally mounted on said stationary bracket, an adjusting lever pivotally mounted on said stationary bracket above said operating lever and extending between said operating lever and said intermediate bracket, external gear teeth on said intermediate bracket, gear teeth on said adjusting lever engageable with said external gear teeth on said intermediate bracket, a cam slot in said operating lever, a pin extending from said adjusting lever operatively engaging in said cam slot so that movement of said operating lever about its pivotal axis will move said adjusting lever to engage or disengage the gear teeth thereof with said external gear teeth on said intermediate bracket, and spring means operatively connected between said operating lever and said stationary bracket to urge said operating lever and thereby said adjusting lever into the engaged position with said intermediate bracket, so that when said adjusting lever is in the disengaged position, the seat back may be adjusted to inclined positions.

2. The reclining device as set forth in claim 1 wherein a substantially diametral notch is provided in said stub shaft, said intermediate bracket has a part bent outwardly to form a spring anchor, and said spiral spring is anchored at its inner end in said notch and at its outer end to said spring anchor.

3. A hinge fitting as claimed in claim 1 and further comprising, a reinforcement plate mounted on said stationary bracket extending over said adjusting lever and gear teeth thereon and at least said cam slot portion of said operating lever, said spring means comprises, a helical coil spring connected to one end to said reinforcing plate and at the other end to a protrusion on said operating lever, and a locking plate mounted on said operating lever to positively engage said adjusting lever on the side thereof opposite said gear teeth to prevent disengagement of said gear teeth when said operating lever is in the engaged position.

* * * * *

UNITED STATES PATENT AND TRADEMARK OFFICE
CERTIFICATE OF CORRECTION

PATENT NO. : 4,457,557

DATED : July 3, 1984

Figure 5:
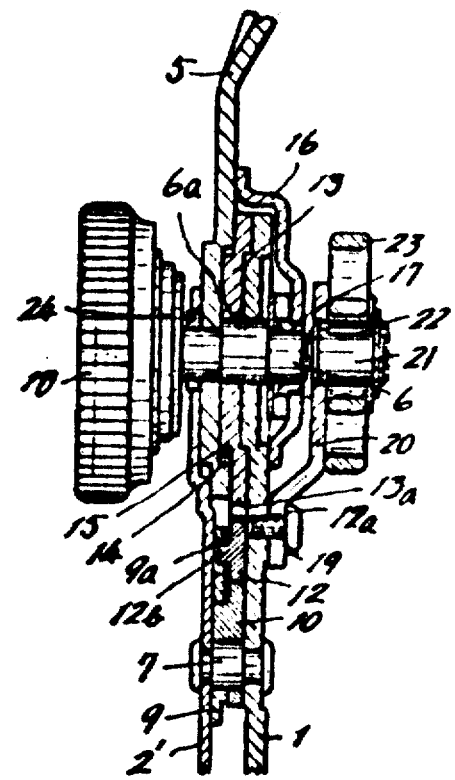

INVENTOR(S) :

It is certified that error appears in the above—identified patent and that said Letters Patent is hereby corrected as shown below:

Add Figures 4 and 5 to the above-captioned patent, as shown on the attached sheet.

Signed and Sealed this

Twenty-second Day of January 1985

[SEAL]

Attest:

DONALD J. QUIGG

Attesting Officer     Acting Commissioner of Patents and Trademarks